(12) United States Patent
Chino et al.

(10) Patent No.: US 6,334,687 B1
(45) Date of Patent: Jan. 1, 2002

(54) STAND TYPE SCREEN APPARATUS AND PROJECTOR USING THE SAME

(75) Inventors: Tatsuya Chino, Shiojiri; Kenji Tanikawa, Kawasaki, both of (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/568,698

(22) Filed: May 11, 2000

(30) Foreign Application Priority Data

May 14, 1999 (JP) .......................................... 11-134287

(51) Int. Cl.[7] .................... G03B 21/14; G03B 21/10; G03B 21/60; H04N 5/64
(52) U.S. Cl. .................... 353/79; 353/119; 248/920; 248/921; 248/922; 348/838; 352/104; 359/460
(58) Field of Search .............................. 353/119, 97, 72, 353/79, 80; 248/917, 919, 920, 921, 922, 923; 348/836, 842, 838; 352/104; 359/460, 443, 461

(56) References Cited

U.S. PATENT DOCUMENTS 2,268,104 A * 12/1941 Bentley ........................ 312/24
4,755,881 A * 7/1988 Bartlett ........................ 358/254
5,287,132 A * 2/1994 Suzuki et al. ................ 353/119

* cited by examiner

*Primary Examiner*—Russell Adams
*Assistant Examiner*—Magda Cruz
(74) *Attorney, Agent, or Firm*—Oliff & Berridge, PLC

(57) ABSTRACT

The invention provides a projector that includes a stand type screen apparatus and an image projection device. The stand type screen apparatus includes a base table, a projecting device installing unit turnably mounted on the base table for detachably installing the image projecting device, a support leg turnably mounted on the base table and a screen holding unit holding the screen and turnably mounted on the support leg. With this arrangement, the size of a rear projection type projector is reduced, an installation space is decreased and portability is enhanced.

28 Claims, 6 Drawing Sheets

1000

STAND TYPE SCREEN APPARATUS AND PROJECTOR USING THE SAME

BACKGROUND OF THE INVENTION

1. Field of Invention

The present invention relates to a screen apparatus for projecting an image using an image projection device and a projector using the screen apparatus.

2. Description of Related Art

There are known projectors which display an enlarged image on a large screen. As one of the above projectors, a rear projection type projector projects an image from an image projection device to the rear side of a screen and the projected image is watched from the front surface side of the screen.

Since the rear projection type projector includes the image projection device and the screen in the cabinet of the apparatus, it is necessary to secure, in the cabinet of the apparatus, an optical distance between the image projection device and the screen in accordance with a display size of an image. Therefore, there is a problem that the rear projection type projector is generally large in size and a large space is necessary to install it. Further, there is also a problem that portability is not good.

SUMMARY OF THE INVENTION

The present invention provides a stand type screen apparatus that reduces the size of a rear projection type projector, decreases an installation space, and enhances portability.

Specifically, the invention provides a stand type screen apparatus for projecting an image on a screen using an image projection device that includes a base table, a projection device installing unit turnably mounted on the base table for detachably installing the image projection device, a support leg turnably mounted on the base table, and a screen holding unit holding the screen and turnably mounted on the support leg.

Since the stand type screen apparatus can be folded by turning the screen holding unit with respect to the support leg and turning the leg portion and the projection device installing unit with respect to the base table, respectively, the size of the apparatus can be reduced when it is not used. The reduction of the size of the apparatus when it is not used can decrease an installation space and enhance portability.

Note that it is preferable that the stand type screen apparatus can be folded to an approximate rectangular prism shape as a whole. When the shape of the stand type screen apparatus at the time it is folded is the approximate rectangular prism, the apparatus can be easily handled and further the portability thereof can be enhanced.

Further, it is preferable that casters are disposed on the vicinity of only one of the ends of the base table. With this arrangement, when the apparatus is moved, it can be easily moved by rotating the casters, whereby the portability can be more improved.

At the time, it is preferable that a grip portion is disposed in the vicinity of the end opposite to the casters, and the grip portion may be gripped and pulled when the apparatus is folded. In this case, the apparatus can be more easily moved by pulling the apparatus while gripping the grip portion.

Note that it is preferable that the support leg is extendable. With this arrangement, the size of the apparatus can be more reduced when it is not used.

Note that the projection device installing unit can be mounted in the vicinity of one of the ends of the base table, and the support leg can be mounted in the vicinity of the other end of the base table. With this arrangement, the projection device installing unit, the support leg and the screen holding unit can be effectively and compactly folded.

The base table can be provided with an accommodating unit for accommodating the projection device installing unit when the stand type screen apparatus is folded. With this arrangement, since the projecting device installing unit can be accommodated in the accommodating unit when the stand type screen apparatus is folded, the size of the apparatus can be more reduced when it is not used. Further, when the apparatus is used, an image supply device (computer, video equipment, and the like), and the like, which supplies image data to the image projection device can be accommodated in the accommodating unit when the apparatus is used.

Further, the base table also can be provided with a turnably disposed cover for covering the accommodating unit.

Note that the base table also may include a power supply unit having a power supply connecting terminal connected to an external power supply and a plurality of internal connecting terminals connected to the power supply connecting terminal in parallel therewith. The provision of the power supply unit permits power to be supplied to various kinds of electronic equipment, such as the image projection device mounted on the screen apparatus, the image supply device, and the like.

The projection device installing unit may include a speaker installing unit.

In the stand type screen apparatus it is preferable that the screen holding unit includes a mirror unit turnably mounted on the support leg and a screen unit turnably mounted on the mirror unit, and the light emitted from the image projecting device is projected to the screen after it is reflected from the mirror unit. With this arrangement, the light emitted from the image projection device can be reflected from the mirror unit and introduced to the screen unit.

At the time, it is preferable that the mutual positional relationship among the projecting device installing unit, the mirror unit and the screen is adjusted such that the image projected from the image projecting device installed to the projecting device installing unit is projected to approximately the center of the screen. With this arrangement, the image projected from the image projection device can be accurately projected on the screen.

Further, it is preferable that the screen unit is mounted in the vicinity of the upper end of the mirror unit on the lower side thereof and the mirror unit includes a shading unit in the vicinity of the upper end of the mirror unit for preventing external light from an upper direction from directly irradiating the surface of the screen on the mirror unit side.

With the above arrangement, since the leakage of the external light from the upper direction from the portion where the screen unit is mounted and the direct irradiation thereof on the surface of the screen on the mirror unit side can be suppressed, the deterioration of an image caused by the external light can be suppressed.

Note that a projector can be arranged by including the stand type screen apparatus and the image projection device for projecting an image.

DETAILED DESCRIPTION OF PREFERRED EMBODIMENTS

An embodiment of the present invention will be described below based on the drawings.

Figure 1:
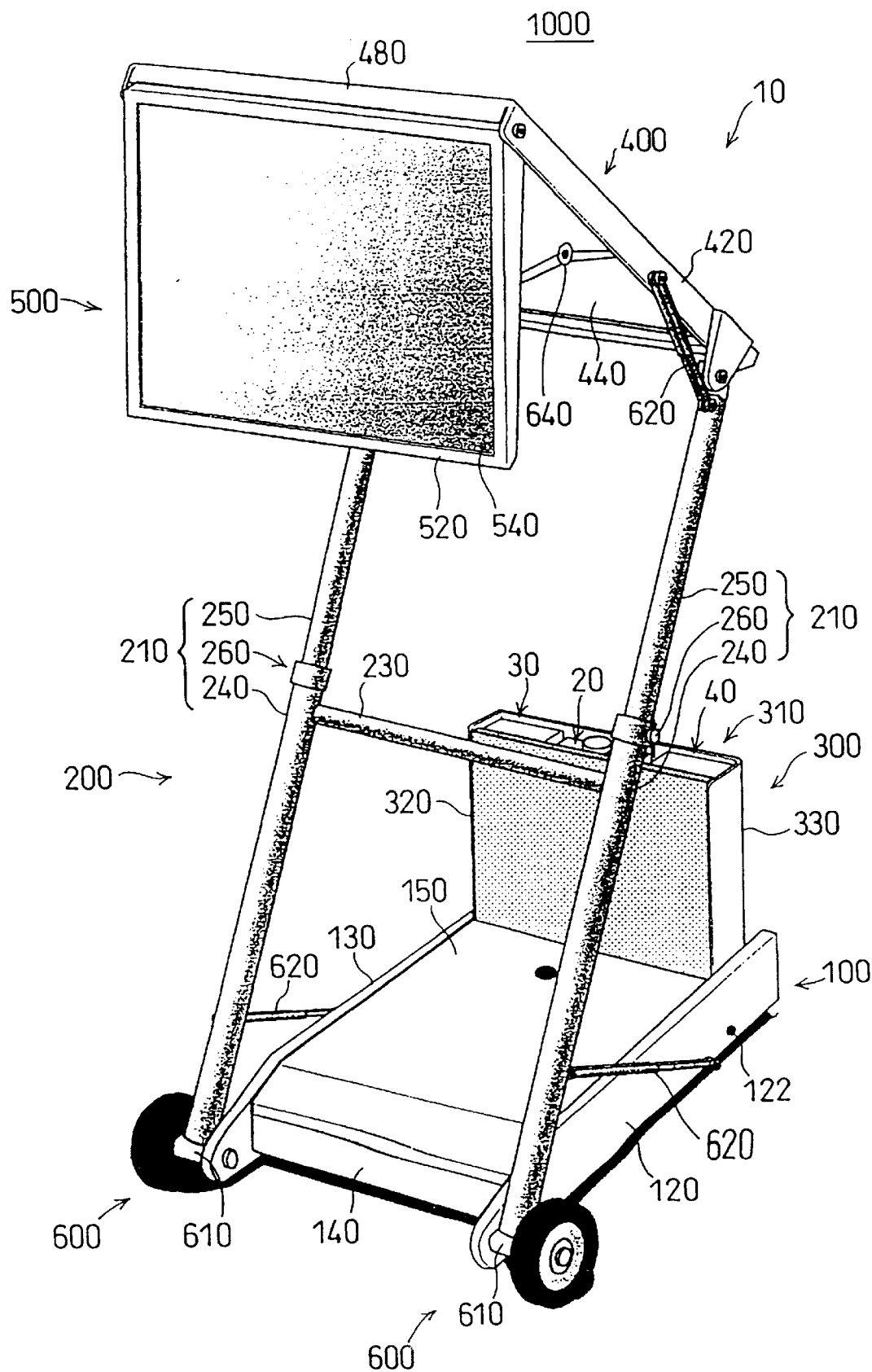
FIG. 1 is a schematic perspective view showing a projector 1000 of the present invention.
Figure 2:
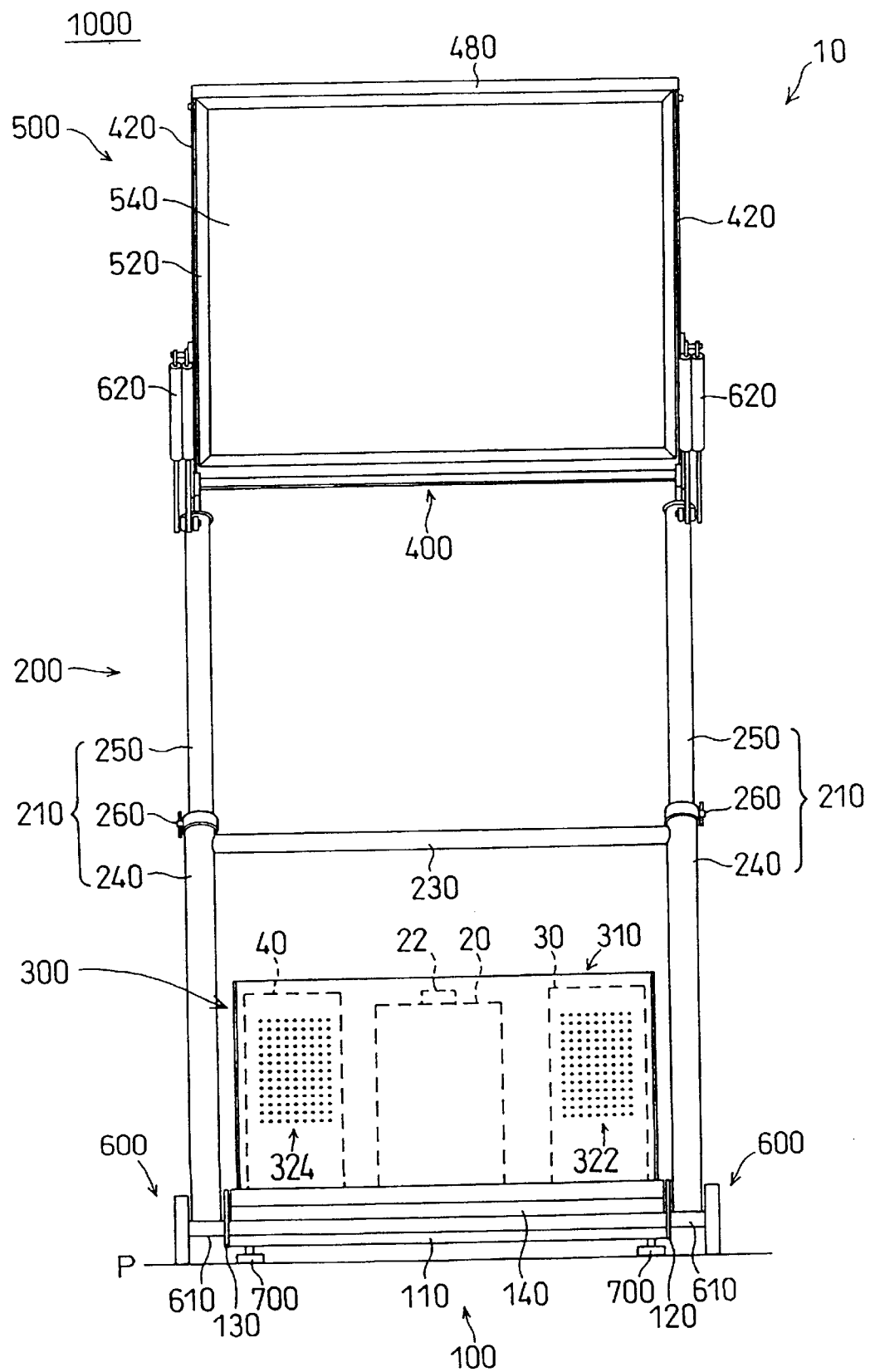
FIG. 2 is a schematic front elevational view showing the projector 1000 of the present invention.
Figure 3:
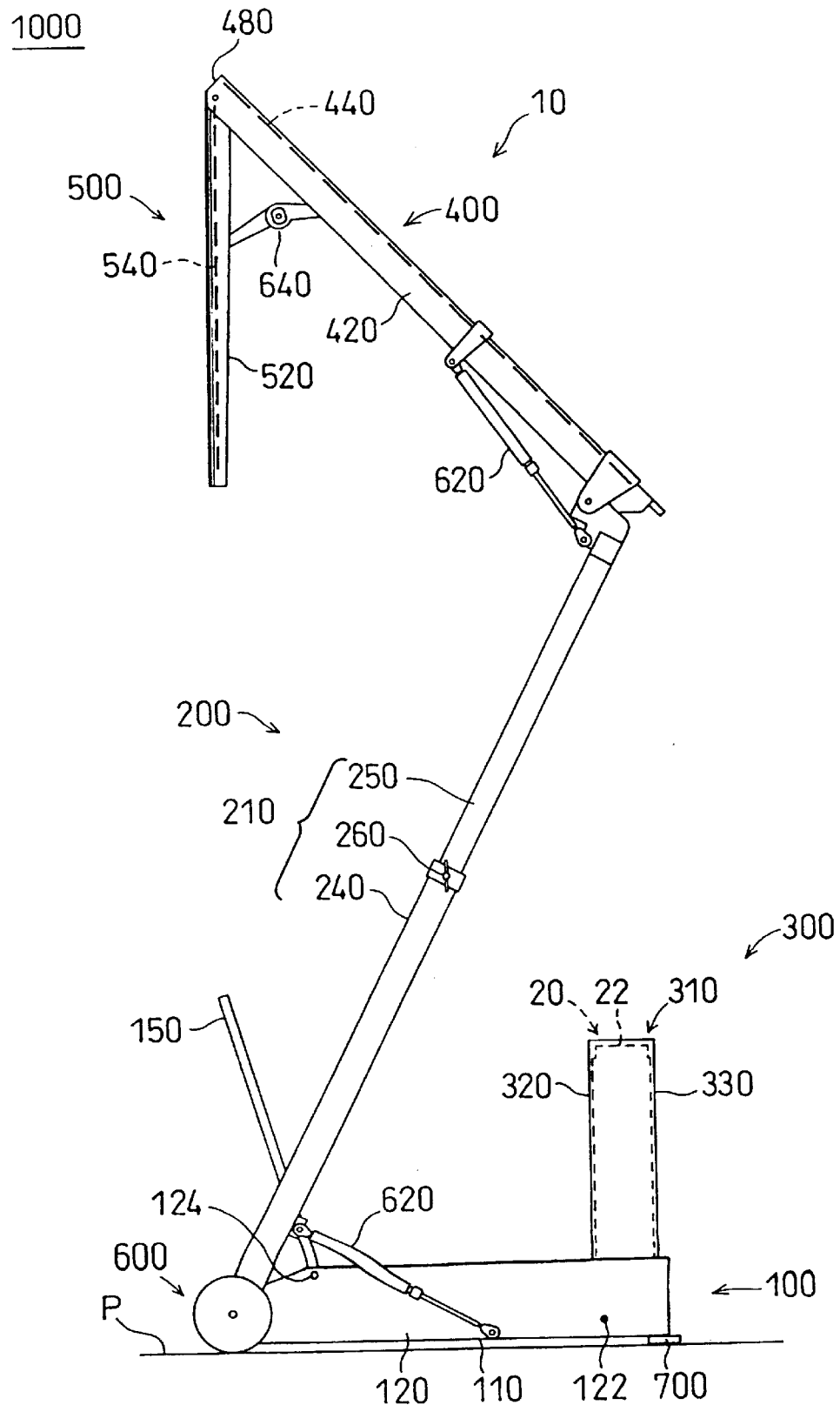
FIG. 3 is a schematic right side view showing the projector 1000 of the present invention.

FIG. 1 is a schematic perspective view showing a projector 1000 of the present invention. FIG. 2 is a schematic front elevational view, and FIG. 3 is a schematic right side view. As shown in FIG. 1, the projector 1000 is composed of a screen device 10 on which an image projection device 20 and two speakers 30 and 40 are detachably installed.

The screen device 10 includes a base table 100, a support leg 200, an image projection device installing unit (projection device installing unit) 300, a mirror unit 400, and a screen unit 500. Note that, the mirror unit 400 and the screen unit 500 correspond to a screen holding unit of the present invention. As shown in FIG. 1 and FIG. 2, the base table 100 is composed of a bottom plate 110, two side plates 120 and 130, a front lid 140 and an upper lid (cover) 150.

As shown in FIG. 1 to FIG. 3, casters 600 are mounted on the outsides of the side plates 120 and 130 at the front surface side ends thereof, respectively. Ends of the support leg 200 are rotatably mounted on the outside tubes of the wheel shafts 610 of the two casters 600.

As shown in FIG. 2, the support leg 200 is composed of two extendable support pipes 210 and a coupling pipe 230 for coupling the two support pipes 210 in an H-shape. Each of the support pipes 210 is composed of a lower pipe 240 rotatably mounted on the wheel shaft 610 and an upper pipe 250 which is inserted into the lower pipe 240 and extendable with respect to it. The upper pipes 250 are fixed by extension fixing members 260. The coupling pipe 230 couples the lower pipes 240 of the two support pipes 210. With this arrangement, the two support pipes 210 can be simultaneously rotated.

Note that the two support pipes 210 are supported in a state in which they are tilted a predetermined angle from the base table 100 by attitude keeping members 620 which are provided with the side plates 120 and 130, respectively. Gas springs, folding metal fittings, and the like, can be used as the attitude keeping members 620.

As shown in FIG. 3, the image projection device installing unit 300 is mounted at the rear ends of the two side plates 120 and 130 so as to turn about the centers of turn 122 formed on the side plates 120 and 130.

As shown in FIG. 1, the image projection device installing unit 300 has a box shape having an opening 310 on the upper portion thereof, and can accommodate the image projection device 20 and the two speakers 30 and 40 and fix them on the back surface plate 330 thereof by fixing devices, such as screws, and the like. As shown in FIG. 2, sound output units 322 and 324 having a multiplicity of through holes for outputting a sound from the two speakers 30 and 40 are disposed on the front surface plate 320 of the image projection device installing unit 300. The image projection device 20 is installed so that a projection lens 22 faces in the direction of the opening 310.

As shown in FIG. 3, the upper lid 150 of the base table 100 is mounted so as to turn about the centers of turn 124 formed on the side plates 120 and 130 (FIG. 3 shows only the center of turn on the side plate 120 side). When the apparatus is not used, the upper lid 150 is opened and the image projection device installing unit 300 is turned and placed on the bottom plate 110, whereby the image projection device 20 and the two speakers 30 and 40 disposed in the image projection device installing unit 300 can be accommodated in the accommodating unit of the base table 100. Further, when the apparatus is in use, the image projecting device installing unit 300 is turned and stood up so that the image projection device 20 can be disposed to face vertically upward and the two speakers 30 and 40 can be disposed to face in a front surface direction. Note that, in this case, an image supply device (computer, video equipment and the like), which supplies image data to the image projection device 20 can be placed in the accommodating unit of the base table 100 in which the image projection device installing unit 300 is accommodated.

Figure 4:
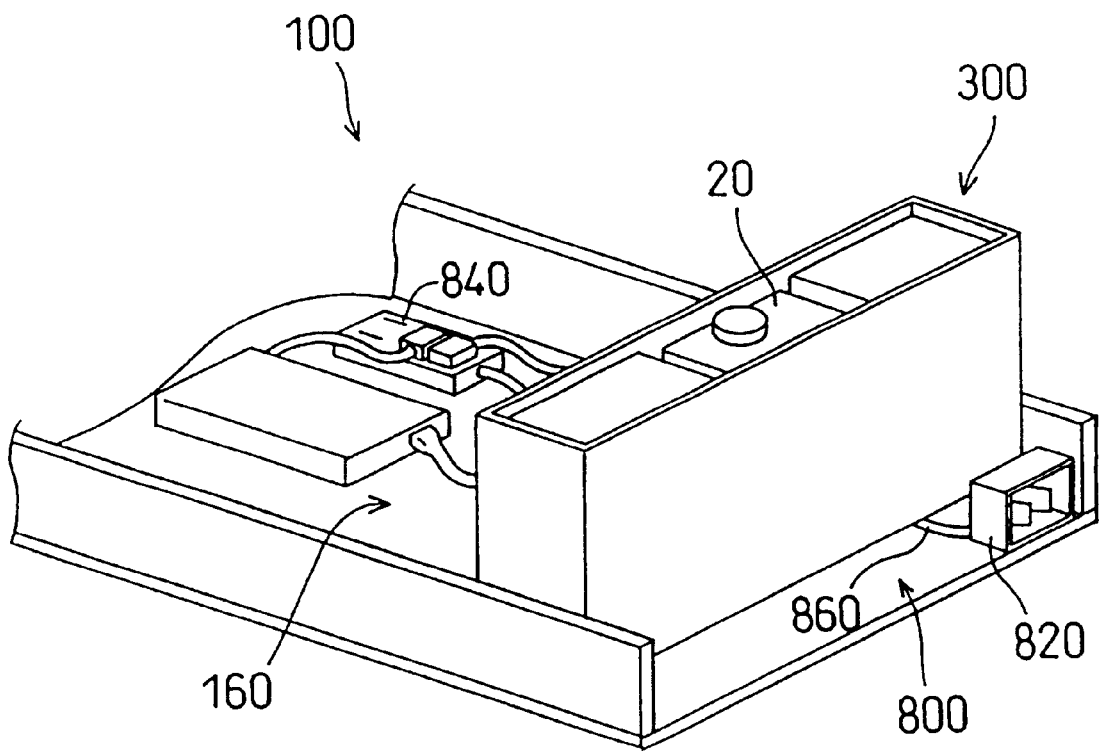
FIG. 4 is an explanatory view showing the interior of a base table 100.

FIG. 4 is an explanatory view showing the interior of the base table 100. A power supply unit 800 is provided in the base table 100. The power supply unit 800 is composed of a power supply connecting terminal 820 connected to an external power supply, a table tap (a plurality of internal connecting terminals) 840, and a cable 860 for connecting the power supply connecting terminal 820 to the table tap 840. Power can be supplied to the image supply device, and the like, which are placed in the accommodating unit 160 in the base table 100 in which the image projection device installing unit 300 is accommodated and to the image projection device 20 placed in the image projection device installing unit 300 through the power supply unit 800.

As shown in FIG. 2, two adjusters 700, which can adjust height so that the bottom plate 110 is in parallel with a reference plane surface P, is mounted on the lower side of the bottom plate 110 of the base table 100.

As shown in FIG. 1 or FIG. 3, the mirror unit 400 is composed of a mirror frame 420 and a mirror 440 disposed in the mirror frame 420. The lower ends of the mirror frame 420 of the mirror unit 400 are turnably coupled with the support leg 200 at the ends of the two upper pipe 250 thereof. Further, the mirror unit 400 is supported with respect to the support leg 200 by the attitude keeping members 620 which are interposed between the two upper pipes 250, respectively.

The screen unit 500 is composed of a screen frame 520 and a screen 540 disposed in the screen frame 520. The screen unit 500 is turnably coupled with the mirror unit 400 at the upper end of the mirror frame 420. Further, the screen unit 500 is supported with respect to the mirror unit 400 by two attitude keeping members 620 which are interposed between it and the mirror frame 420. Folding metal fittings, hook members and the like can be used as the attitude keeping members 640.

A shading unit 480 is disposed to the outside (upper side) of the portion of the mirror frame 420 where the screen unit 500 is coupled therewith so as to cover the coupled portion. The shading unit 480 shades external light from an upper direction prevent the external light from directly irradiating the surface of the screen 540 on the mirror unit 400 side. With this arrangement, the deterioration of a displayed image caused by the external light other than the light emitted from the image projection device 20 can be suppressed.

Figure 5:
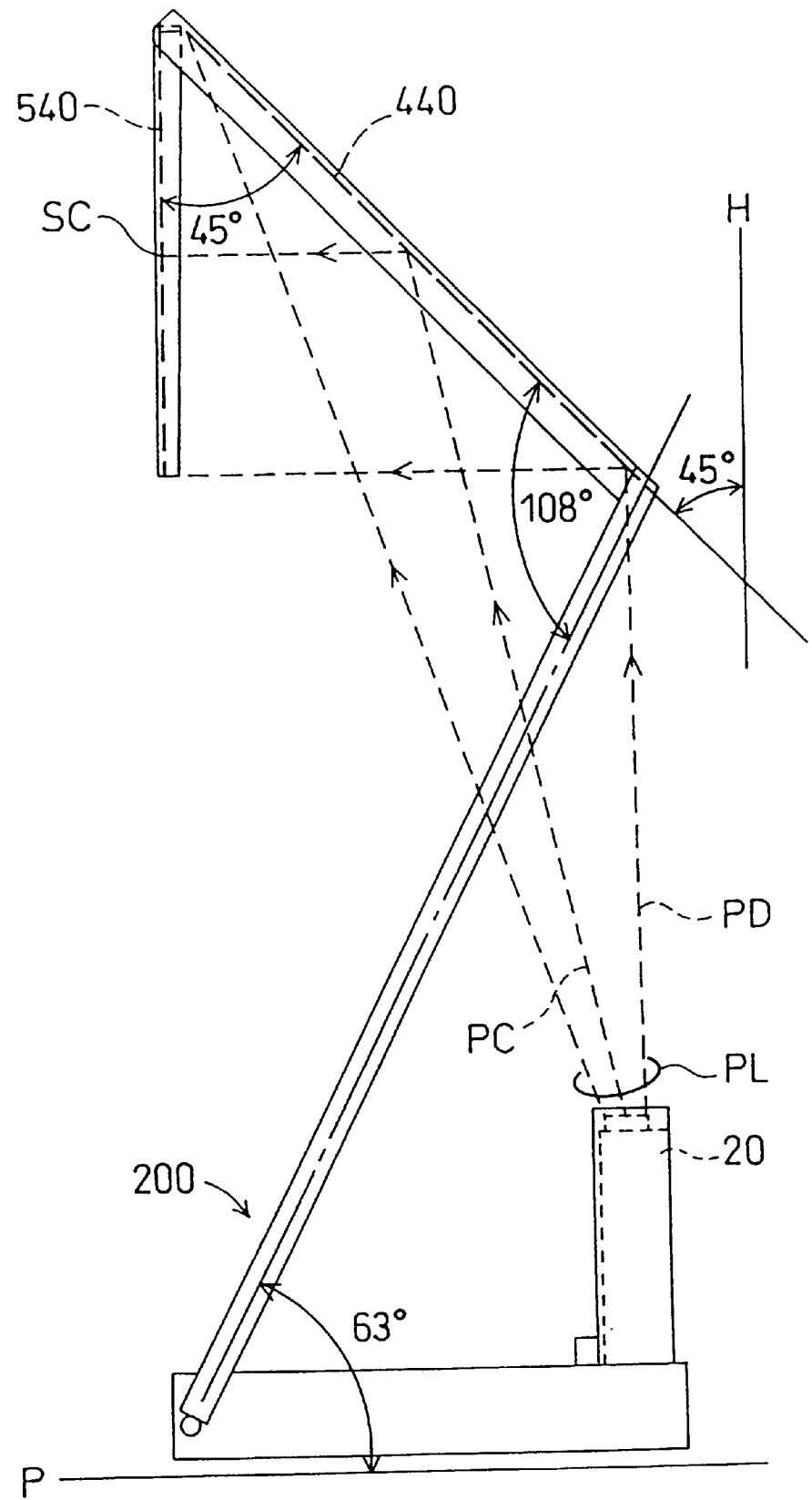
FIG. 5 is an explanatory view showing a light passage of the light emitted from an image projection device 20.

FIG. 5 is an explanatory view showing a light passage of the light emitted from the image projection device 20. The light PL emitted from the image projection device 20 is reflected from the mirror 440 and forms an image on the screen 540. The mirror 440 is adjusted with respect to the image projection device 20 such that the center PC of the light emitted from the image projection device 20, which carries out tilt and shift projection, is incident on the center SC of the screen 540. The embodiment shows an example in which the screen 540 and the image projection device 20 are disposed in parallel with a plane surface H which is vertical to the reference plane surface P, and the lower end PD of the light PL emitted from the image projection device 20 is in parallel with the vertical surface H. Specifically, the screen 540 is set to be parallel with the vertical surface H and the mirror 440 is set to have a tilt of 45° with respect to the vertical surface H. Note that the positional relationship among the screen 540, the mirror 440 and the image projection device 20 is not limited to the above, and it is sufficient that the positional relationship is adjusted so that the center PC of the light emitted from the image projection device 20, which carries out the tilt and shift projection, is incident on the center SC of the screen 540.

Figure 6:
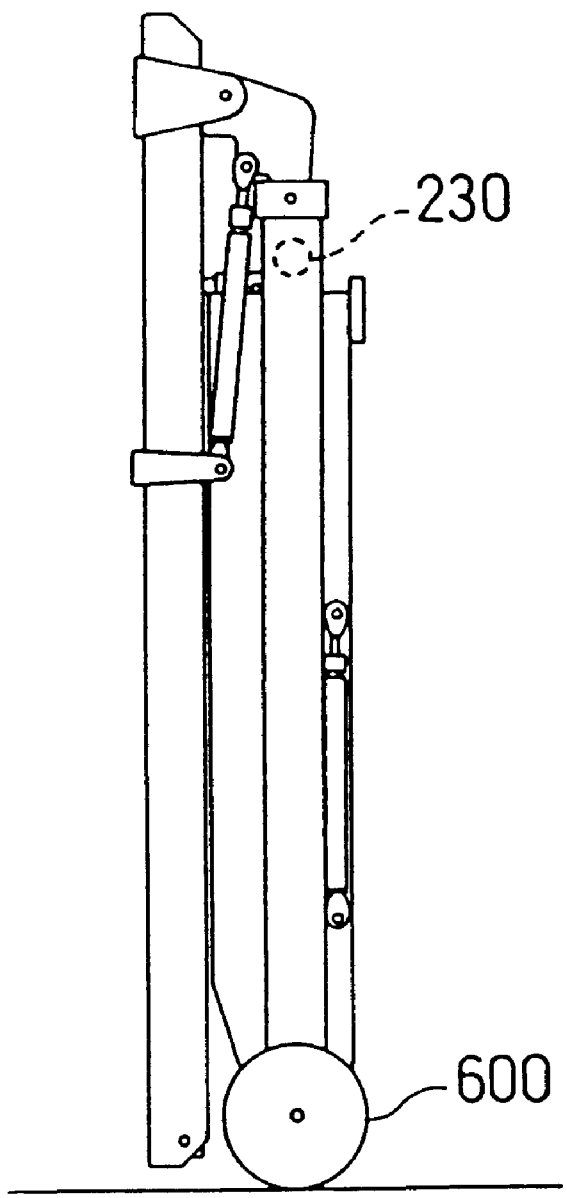
FIG. 6 is a right side view showing a state in which the projector 1000 of the present invention is folded.

FIG. 6 is a right side view showing a state in which the projector 1000 of the present invention is folded. The projector can be folded by the following procedure.

1) The two upper pipes 250 of the support leg 200 are accommodated in the pipes 240 which correspond thereto.

2) After the screen unit 500 is folded in the mirror unit 400, the mirror unit 400 is folded on the support leg 200 side.

3) The upper lid 150 is opened, and the image projection device installing unit 300 is accommodated in the base table 100.

4) The support leg 200 is folded on the base table 100 side.

With the above procedure, as shown in FIG. 6, the size of the projector 1000 can be reduced as compared with that when it is used. With this arrangement, the installation space of the apparatus when it is not used can be reduced and the portability of the apparatus can be enhanced. Note that since the shape of the apparatus of the present invention is an approximate rectangular prism when it is folded, the apparatus can be easily handled and further it has excellent portability. When the apparatus is moved, since the two casters 600 are rotated by gripping and pulling the coupling pipe 230 of the support leg 200, the apparatus can be easily moved as a whole. Note that a grip portion may be disposed in the vicinity of the end opposite to the casters, and the grip portion may be gripped and pulled when the apparatus is folded.

Note that the present invention is by no means limited to the above respective examples and can be embodied in various modes within the range which does not depart from the gist of the invention, and, for example, the following modification is also possible.

While the back rear projection type projector in which the screen holding unit includes the mirror unit 400 and the screen unit 500 is shown in the projector 1000 of the embodiment, the present invention is not limited thereto. It is also possible to arrange a front projection type projector by omitting the mirror unit 400 and replacing it with the screen unit 500.

What is claimed is:

1. A stand type screen apparatus for projecting an image on a screen using an image projection device, comprising:
   a base table;
   a projection device installing unit turnably mounted on the base table that detachably installs the image projection device;
   a support leg turnably mounted on the base table; and
   a screen holding unit that holds the screen and is turnably mounted on the support leg.

2. The stand type screen apparatus according to claim 1, further comprising a plurality of casters being disposed in the vicinity of only one of the ends of the base table.

3. The stand type screen apparatus according to claim 2, further comprising a grip portion being disposed in the vicinity of the end opposite to the casters when the stand type screen apparatus is folded.

4. The stand type screen apparatus according to claim 1, the support leg being extendable.

5. The stand type screen apparatus according to claim 1, the projection device installing unit being mounted in the vicinity of one of the ends of the base table and the support leg being mounted in the vicinity of the other end of the base table.

6. The stand type screen apparatus according to claim 1, the base table comprising an accommodating unit that accommodates the projection device installing unit when the stand type screen apparatus is folded.

7. The stand type screen apparatus according to claim 6, the base table comprising a turnably disposed cover that covers the accommodating unit.

8. The stand type screen apparatus according to claim 1, the base table comprising a power supply unit having a power supply connecting terminal connected to an external power supply and a plurality of internal connecting terminals connected to the power supply connecting terminal in parallel therewith.

9. The stand type screen apparatus according to claim 1, the projection device installing unit comprising a speaker installing section.

10. The stand type screen apparatus according to claim 1, the screen holding unit comprising a mirror unit turnably mounted on the support leg and a screen unit turnably mounted on the mirror unit, and the light emitted from the image projection device being projected to the screen after it is reflected from the mirror unit.

11. The stand type screen apparatus according to claim 10, a mutual positional relationship among the projection device installing unit, the mirror unit and the screen being adjusted such that the image projected from the image projection device installed to the projection device installing unit is projected to approximately the center of the screen.

12. The stand type screen apparatus according to claim 10, the screen unit being mounted in the vicinity of the upper end of the mirror unit on the lower side thereof and the mirror unit including a shading unit in the vicinity of the upper end of the mirror unit that prevents external light from an upper direction from directly irradiating the surface of the screen on the mirror unit side.

13. A projector for projecting and displaying an image, comprising:
   the stand type screen apparatus according to claim 1; and
   an image projection device that projects the image.

14. The projector according to claim 13, further comprising a plurality of casters being disposed in the vicinity of only one of the ends of the base table.

15. The projector according to claim 14, further comprising a grip portion being disposed in the vicinity of the end opposite to the casters when the stand type screen apparatus is folded.

16. The projector according to claim 13, the support leg being extendable.

17. The projector according to claim 13, the projection device installing unit being mounted in the vicinity of one of the ends of the base table and the support leg being mounted in the vicinity of the other end of the base table.

18. The projector according to claim 13, the base table comprising an accommodating unit that accommodates the projection device installing unit when the stand type screen apparatus is folded.

19. The projector according to claim 18, the base table comprising a turnably disposed cover that covers the accommodating unit.

20. The projector according to claim 13, the base table comprising a power supply unit having a power supply connecting terminal connected to an external power supply and a plurality of internal connecting terminals connected to the power supply connecting terminal in parallel therewith.

21. The projector according to claim 13, the projection device installing unit comprising a speaker installing section.

22. The projector according to claim 13, the screen holding unit comprising a mirror unit turnably mounted on the support leg and a screen unit turnably mounted on the mirror unit, and the light emitted from the image projection device being projected to the screen after it is reflected from the mirror unit.

23. The projector according to claim 22, a mutual positional relationship among the projection device installing unit, the mirror unit and the screen being adjusted such that the image projected from the image projection device installed to the projection device installing unit is projected to approximately the center of the screen.

24. The projector according to claim 22, the screen unit being mounted in the vicinity of the upper end of the mirror unit on the lower side thereof and the mirror unit including a shading unit in the vicinity of the upper end of the mirror unit that prevents external light from an upper direction from directly irradiating the surface of the screen on the mirror unit side.

25. A stand type screen apparatus for projecting an image on a screen using an image projection device, comprising:
 a base table;
 a projection device installing unit turnably mounted on the base table that detachably installs the image projection device;
 a support leg turnably mounted on the base table; and
 a screen holding unit that holds the screen and is turnably mounted on the support leg, the stand type screen apparatus being in an approximate rectangular prism shape as a whole when folded.

26. The stand type screen apparatus according to claim 25, further comprising a plurality of casters being disposed in the vicinity of only one of the ends of the base table.

27. The stand type screen apparatus according to claim 26, further comprising a grip portion being disposed in the vicinity of the end opposite to the casters when the stand type screen apparatus is folded.

28. The stand type screen apparatus according to claim 25, the support leg being extendable.

* * * * *